United States Patent
League

(10) Patent No.: US 10,874,093 B2
(45) Date of Patent: Dec. 29, 2020

(54) SPINNING BLADE MECHANISM FOR FISHING BAIT

(71) Applicant: Timothy William League, Cumming, GA (US)

(72) Inventor: Timothy William League, Cumming, GA (US)

(*) Notice: Subject to any disclaimer, the term of this patent is extended or adjusted under 35 U.S.C. 154(b) by 164 days.

(21) Appl. No.: 15/941,866

(22) Filed: Mar. 30, 2018

(65) Prior Publication Data

US 2019/0297864 A1 Oct. 3, 2019

(51) Int. Cl.
*A01K 85/12* (2006.01)
*A01K 85/08* (2006.01)

(52) U.S. Cl.
CPC .............. *A01K 85/12* (2013.01); *A01K 85/08* (2013.01)

(58) Field of Classification Search
CPC ........ A01K 85/00; A01K 85/08; A01K 85/12; A01K 83/06
USPC ........... 43/42.11, 42.12, 42.14–42.17, 42.19, 43/42.2, 42.21, 42.36, 44.2, 44.9, 44.91
See application file for complete search history.

(56) References Cited

U.S. PATENT DOCUMENTS

| | | | | |
|---|---|---|---|---|
| 2,079,509 A * | 5/1937 | Kettring | ........... | A01K 85/02 43/35 |
| 5,094,026 A * | 3/1992 | Correll | ........... | A01K 85/00 43/42.11 |
| 5,207,016 A * | 5/1993 | Pate | ........... | A01K 85/00 43/42.28 |
| 5,261,182 A * | 11/1993 | Link | ........... | A01K 85/00 43/42.28 |
| 5,661,923 A * | 9/1997 | Fellowes | ........... | A01K 95/00 43/43.14 |
| 6,598,336 B2 * | 7/2003 | Link | ........... | A01K 85/00 43/42.24 |
| 8,024,887 B2 * | 9/2011 | Milanowski | ........... | A01K 85/12 43/42.2 |
| 8,146,288 B2 * | 4/2012 | Barczak | ........... | A01K 85/00 43/42.12 |
| 9,061,758 B2 * | 6/2015 | Schimke | ........... | B64C 27/467 |
| 2002/0157300 A1 * | 10/2002 | Saul | ........... | A01K 85/00 43/42.33 |
| 2004/0025405 A1 * | 2/2004 | Rivera Gomez | ........... | A01K 85/00 43/42.12 |
| 2004/0200122 A1 * | 10/2004 | Aanenson | ........... | A01K 85/00 43/17.6 |
| 2015/0250154 A1 * | 9/2015 | Hamaguchi | ........... | A01K 85/00 43/42.1 |

FOREIGN PATENT DOCUMENTS

| | | | | | |
|---|---|---|---|---|---|
| GB | 191225025 A | * | 7/1913 | ........... | A01K 85/12 |
| GB | 337616 A | * | 11/1930 | ........... | A01K 85/12 |
| GB | 563612 A | * | 8/1944 | ........... | A01K 85/12 |
| GB | 944901 A | * | 12/1963 | ........... | A01K 85/12 |
| GB | 1361524 A | * | 7/1974 | ........... | A01K 85/12 |

\* cited by examiner

*Primary Examiner* — Joshua J Michener
*Assistant Examiner* — Arfan Y. Sinaki
(74) *Attorney, Agent, or Firm* — Dunlap Bennett & Ludwig, PLLC; Brendan E. Squire

(57) ABSTRACT

A spinning blade mechanism for fishing bait includes a spinner that is rotationally carried on a sleeve cone. The sleeve cone has in interior cavity that is dimensioned to carry a head of a fishing bait. When the fishing bait is a bait fish, the sleeve cone prevents the deterioration of the bait fish as it is trolled through the water. The spinner provides a fish attracting vibration to attract game fish to the lure.

11 Claims, 5 Drawing Sheets

SPINNING BLADE MECHANISM FOR FISHING BAIT

BACKGROUND OF THE INVENTION

The present invention relates to fishing lures and, more particularly, to reflective blades utilized with ocean offshore trolling lures and dead bait tackle.

"Fresh water" and "in shore" spinning type lures are designed to be cast then hand retrieved at slower speeds by the angler. The size, color, and movement of the lure are also meant to attract "fresh water" and "in shore" species. Currently available trolling lures and dead bait fish lack adequate vibration and light reflection qualities to elicit reactionary feeding strikes from offshore game fish.

As can be seen, there is a need for enhancing the vibration and light reflection qualities for ocean offshore fishing lures.

SUMMARY OF THE INVENTION

In one aspect of the present invention a spinning blade mechanism for a fishing bait is disclosed. The mechanism includes a sleeve having a leading end and a trailing end. A sleeve cone define the trailing end of the sleeve, with the sleeve cone having a cavity dimensioned to receive a head of a bait through an aft opening of the cavity. A sleeve post defines the forward end of the sleeve. The sleeve post has a cylindrical outer surface and t is configured to receive a spinner blade for axial rotation about the sleeve post.

The spinner has a central hub, with a plurality of blades that extend radially outward from the hub. A bore extends through the hub. The plurality of blades are disposed in a spaced apart relation about a rotational axis of the hub. The plurality of blades may have an aft swept curvature along a leading edge of each of the plurality of blades and terminate at an upturned end at a trailing edge of each of the plurality of blades.

In certain embodiments, a protrusion may extend from a lateral surface of the sleeve post and a slot is defined in an interior surface of the bore. The bore is dimensioned for axial rotation of the spinner about the sleeve post. An aft end of the protrusion is spaced apart from a forward end of the sleeve cone such that a longitudinal length of the hub is carried between the aft end of the protrusion and the forward end of the sleeve cone.

In other aspects of the invention, a spinning blade mechanism for a fishing bait includes a sleeve having a leading end and a trailing end. A sleeve cone defines the trailing end of the sleeve, while a sleeve post defines the forward end of the sleeve. A spinner having a central hub, with a plurality of blades that extend radially outward from the hub. A bore extends through the hub; wherein the hub is rotationally carried on the sleeve post for axial rotation of the spinner about the sleeve post.

An interior channel may defined through the sleeve post and is dimensioned to receive a fishing line through the interior channel. The plurality of blades may be disposed in a spaced apart relation about a rotational axis of the hub. The plurality of blades may be formed to have an aft swept curvature along a leading edge of each of the plurality of blades and terminate at an upturned end at a trailing edge of each of the plurality of blades. The spinner and sleeve may have highly reflective surfaces to attract game fish.

These and other features, aspects and advantages of the present invention will become better understood with reference to the following drawings, description and claims.

DETAILED DESCRIPTION OF THE INVENTION

Figure 1:
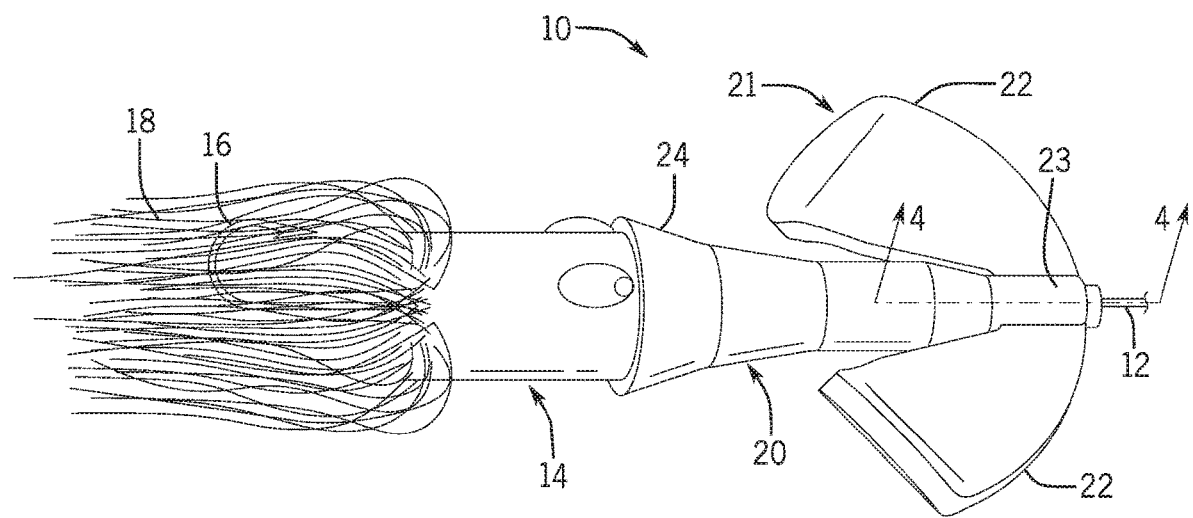
FIG. 1 is side perspective view of the spinning blade mechanism with a fishing lure.
Figure 2:
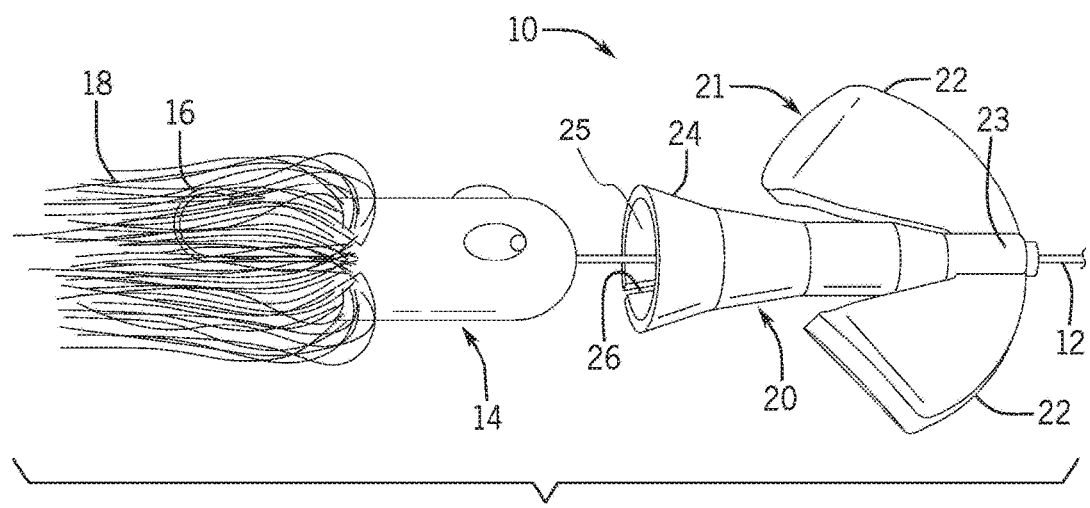
FIG. 2 is a partially exploded side perspective view of the spinning blade mechanism with a fishing lure.
Figure 3:
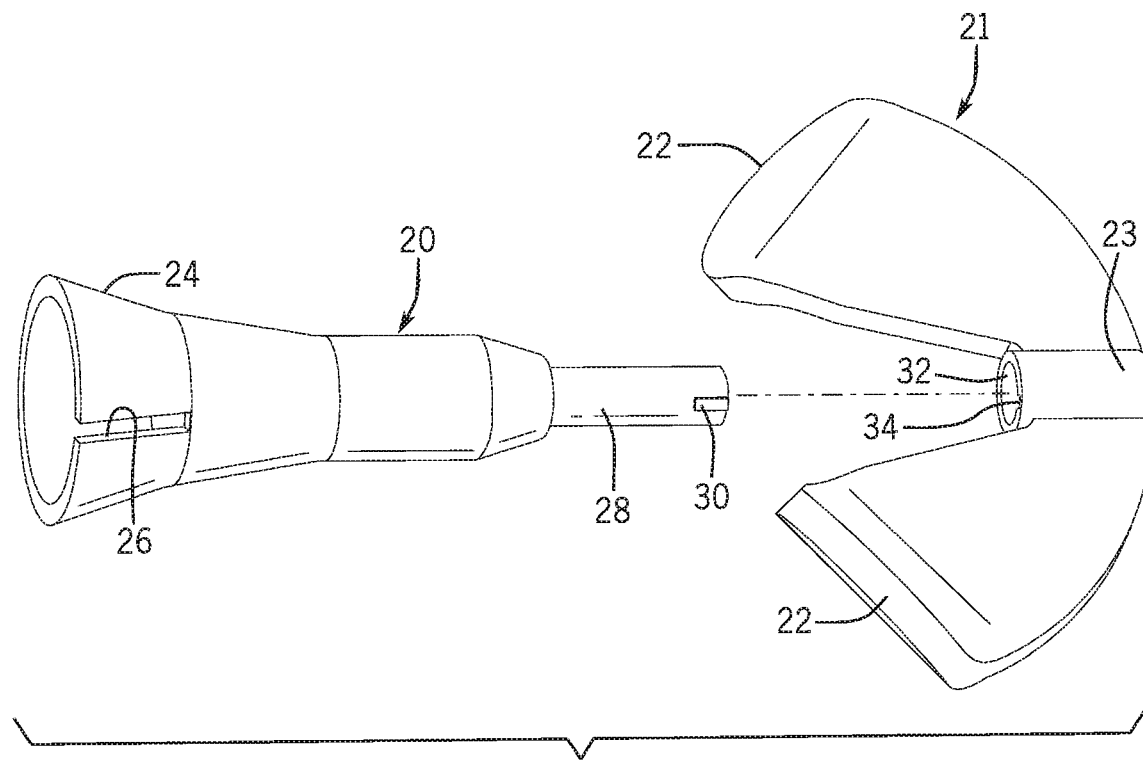
FIG. 3 is an exploded perspective view of the spinning blade mechanism.
Figure 4:
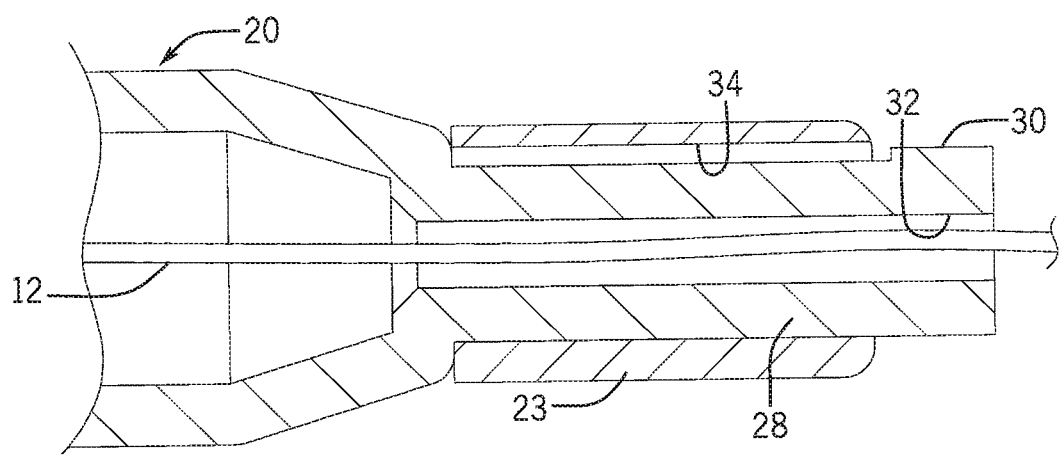
FIG. 4 is a cross-sectional view taken on line 4-4 of FIG. 1.
Figure 5:
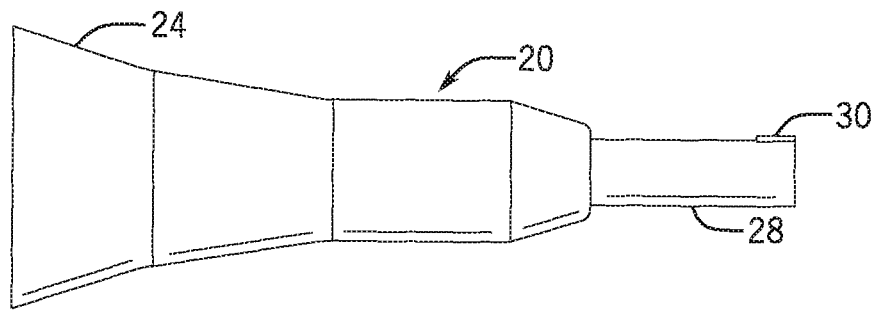
FIG. 5 is a side elevational view of the protective sleeve component.
Figure 6:
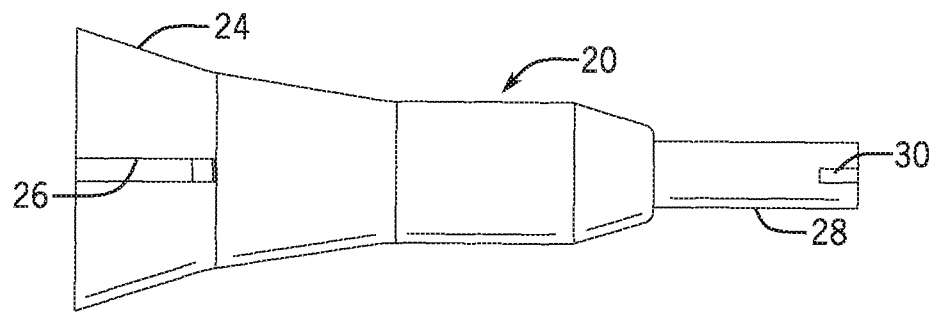
FIG. 6 is a top plan view of the protective sleeve component.
Figure 7:
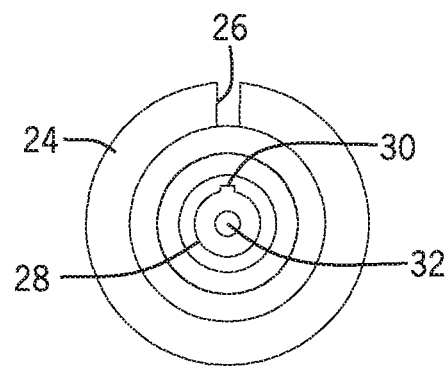
FIG. 7 is a rear elevation view of the protective sleeve component.
Figure 8:
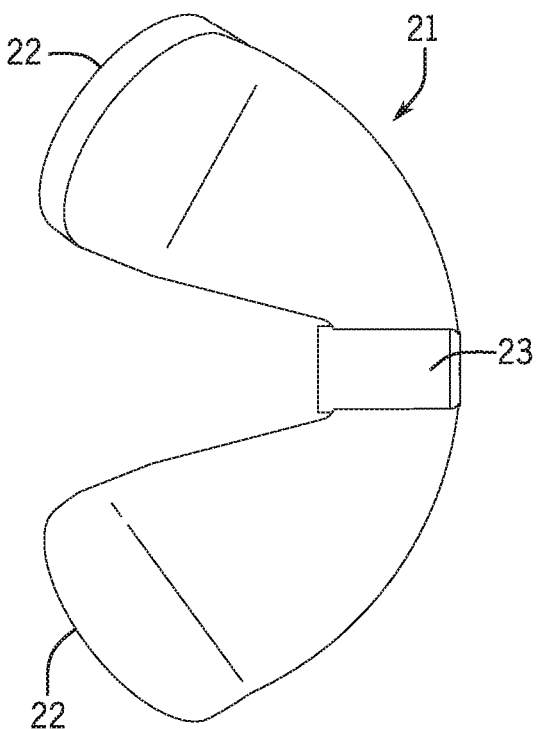
FIG. 8 is a side elevational view of the spinning blade component.
Figure 9:
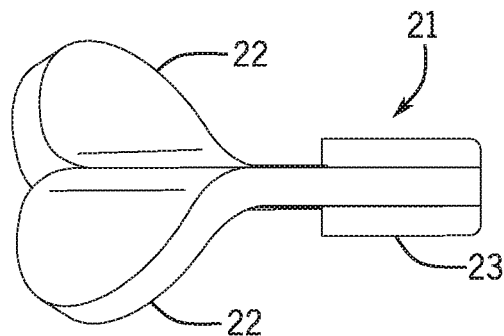
FIG. 9 is a top plan view of the spinning blade component.
Figure 10:
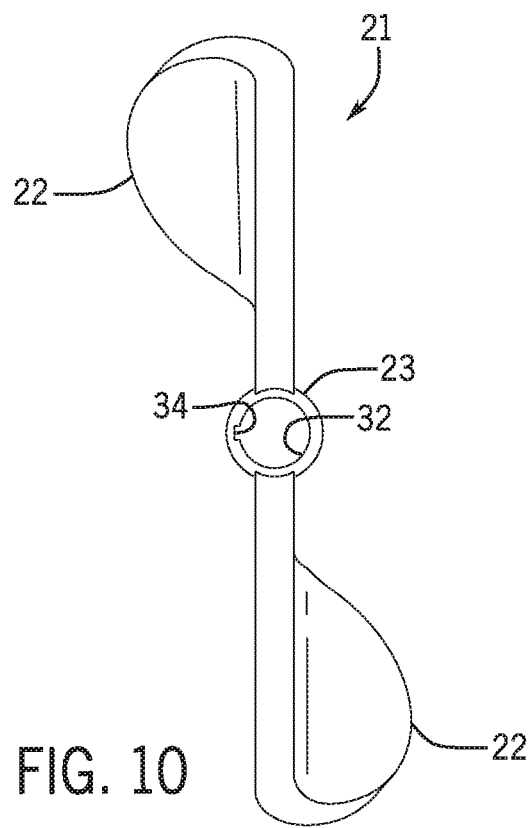
FIG. 10 is a rear elevation view of the spinning blade component.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a blade and spinning mechanism that creates vibrations in the water that are similar to a struggling or a fleeing bait fish which a game fish can sense or feel with their lateral lines. The blade may also be made of a highly reflective surface to reflect light as it spins creating a flash similar to live bait fish. Aspects of the spinning blade mechanism may also protect the head of a bait fish from deterioration or destruction as the bait is trolled through the water.

The spinning blade mechanism is well suited for offshore trolling and may be used a higher speeds, such as 4-10 knots. It is also sized and shaped appropriately to attract pelagic fish while also being interchangeable or usable with any lure in an angler's existing collection.

Referring now to FIGS. 1 through 11, the blade and spinning mechanism 10 of the present invention are depicted in various levels of detail and embodiments. As seen in reference to FIGS. 1 and 2, the blade and spinning mechanism 10 is shown in use applied to a fishing line 12, which is connected to an artificial lure body 14. The lure body includes a hook 16, and may include a skirt 18, or other element to attract a game fish. As seen in reference to FIG. 11, the blade and spinning mechanism 10 is shown attached to a fishing line 12 in a leading position relative to a conventional a dead bait fish 38, such as a ballyhoo bait fish.

The spinning mechanism 10 comprises: a sleeve 20 and a spinner 21. The spinner 21 is rotatably coupled to a cylindrical shaft 28 extending from a forward end of the sleeve 20.

The sleeve 20 includes a first, leading end 28, and a second, trailing end 24. The leading end 28 includes an elongate tubular portion, or sleeve post 28, with a channel 32 extending through a longitudinal length of the sleeve 20. The channel 32 has a diameter that is greater than an outside diameter of a fishing line 12 to which the spinning mechanism 10 is to be operatively attached. The inside diameter of the channel 32 may be selected to accommodate fishing line 12 of different diameters, based on their type, such as popular monofilament, or their strength, conventionally measured as a test of the line.

The sleeve 20 has a has a second, trailing end 24, that is of a generally frustoconical or flared shape, in that it diverges outwardly from a longitudinal axis of the sleeve 20 as it progresses rearward towards the trailing end of the sleeve 20. While depicted in the drawings as a conical, linear taper, in certain embodiments, trailing end may alternatively have concave, convex, or cylindrical shapes, or combinations thereof, along its longitudinal length. Preferably, the trailing end, hereinafter the sleeve cone 24 will define a hollow cup portion at the cone opening 25 that faces rearwardly towards a head of fishing lure 14 or bait fish 38. More preferably, the sleeve cone 24 and cone opening 25 are dimensioned to fit over the nose of the baitfish 38 or the front end or head of a trolling lure 14.

The spinner 21 includes a plurality of blades 22 are radially extend from a hub 23. The plurality of blades 22 are disposed in a spaced apart relation about the hub 23. A forward edge of the blades 22 may include an aft swept curvature terminating at an upturned end. The hub 23 includes a bore 32 that is dimensioned to receive the sleeve post 28 so that the spinner 21 may rotate freely about the sleeve post 21 in response to fluid or mechanical forces acting on the blades 22.

The hub 23 may also be provided with a slot 34 defined in a surface of the bore 32. The slot 34 is dimensioned to receive a protrusion 30 extending from a forward end of the post 28 of the sleeve 20. An aft end of the protrusion 30 is defined so that the longitudinal length of the hub 23 is received between a forward end of the sleeve cone 24 and aft end of the protrusion so that the spinner 21 may be captively retained on the sleeve post 28.

The sleeve 20 and spinner 21 may be formed of any suitable material, such as a metal or a plastic. The surface of the sleeve 20 or the spinner 21 may also include a highly reflective surface to reflect light as it spins creating a flash similar to live bait fish.

Once assembled a free end of the fishing line 12 is threaded through the channel 32, between the leading end and the trailing of the sleeve 20. Depending on use, the threaded free end is then attached to a fishing line attached to a reel, or alternatively, to the head a fishing lure 14 or a rigging wire for retaining a bait fish 38 by any conventional method, such as a knot, or a pin rig 36. A slot 26 may be defined in the sleeve cone 24 to retain the pin rig 36 to prevent spinning of the sleeve cone 24 on the head of the bait fish 38. When the device is installed on the fishing line 12 and pulled through water hydraulic forces act on the spinner 21 to rotate the spinner 21 about the sleeve post 28.

Figure 11:
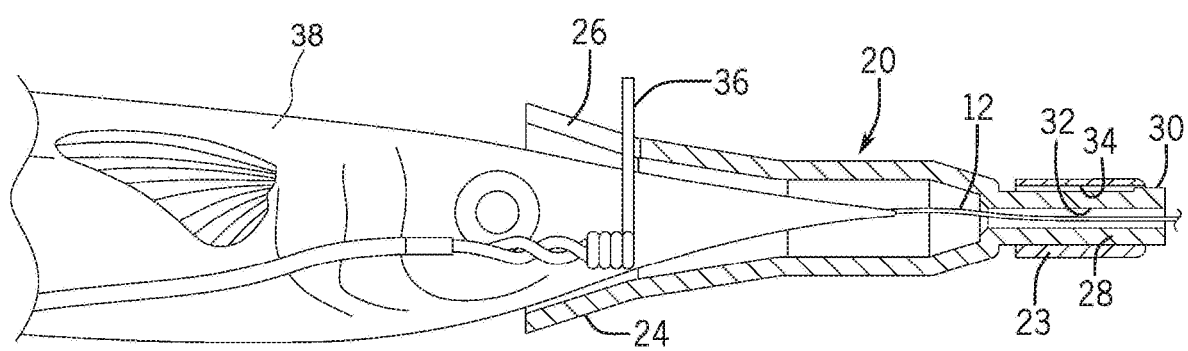
FIG. 11 is a side elevation view with parts shown in cross-section of an alternate configuration of the spinning blade mechanism.

As seen in reference to FIG. 11, the sleeve cone 24 at the rear of the sleeve 20 fits over the nose of the bait fish 38 or trolling lure 14. In use, water pressure pushing against the sleeve cone 24 and spinner 21 urges the sleeve cone 24 against the head of the baitfish 38 or lure 14 to prevent the sleeve 20 from spinning.

The sleeve cone 24 is particularly well suited for dead bait 38, which are dead bait fish 38 that are rigged for trolling, such as the ballyhoo depicted in FIG. 11. The sleeve cone 24 advantageously prevents the water from entering the nose, eyes, or mouth of the bait fish 38 preventing wash out, a condition where the high water pressures from trolling the bait fish 38 erodes the flesh of the bait fish 38 making it ill-suited for attracting and catching game fish.

To properly assemble the elements, a leading end of the sleeve post 28 is inserted through the bore 32 of the hub 23. When equipped, the protrusion 30 is aligned with the slot 34 so that the spinner 21 is positioned adjacent to a leading end of the sleeve cone 24. The spinner 21 may then be slightly rotated so that the protrusion 30 and slot 34 are misaligned and the spinner 21 is captively retained on the sleeve post 28. To disassemble the components, the protrusion 30 and slot 34 are aligned and the spinner 21 and sleeve 20 may be separated.

In use, a fisherman inserts the free end of the fishing line 12 from their existing trolling rig through the sleeve 20. Once on the line 12, the device easily slides down the line 12 to the trolling bait 14, 38, where the cone opening 25 at the end of the sleeve 20 fits over the nose of the lure 14 or bait fish 38. Next the fisherman simply uses their trolling lure 14 or rigged bait 38 as they typically would, pulling it behind the boat at their chosen speed, distance, and depth.

It should be understood, of course, that the foregoing relates to exemplary embodiments of the invention and that modifications may be made without departing from the spirit and scope of the invention as set forth in the following claims.

What is claimed is:

1. A spinning blade mechanism for a fishing bait, comprising:
   a sleeve having a leading end and a trailing end;
   a sleeve cone defining the trailing end of the sleeve, the sleeve cone having a frustoconical cavity dimensioned to receive a head of a bait through an aft opening of the frustoconical cavity with the head of the bait carried within the frustoconical cavity; and
   a sleeve post defining the leading end of the sleeve, the sleeve post having a cylindrical outer surface, a protrusion extending from a the cylindrical outer surface, wherein the sleeve post is configured to receive a central hub of a spinner when the protrusion is aligned with a slot defined in an interior surface of the central hub of the spinner, the protrusion retaining the spinner during axial rotation of the spinner about the sleeve post.

2. The spinning blade mechanism of claim 1, further comprising:
   the spinner rotationally carried on the sleeve post, the spinner having a plurality of blades that extend radially outward from the central hub; and
   a bore extending through the central hub.

3. The spinning blade mechanism of claim 2, wherein the plurality of blades are disposed in a spaced apart relation about a rotational axis of the central hub.

4. The spinning blade mechanism of claim 3, wherein the plurality of blades have an aft swept curvature along a leading edge of each of the plurality of blades and terminate at an upturned end at a trailing edge of each of the plurality of blades.

5. The spinning blade mechanism of claim 4,
   wherein the protrusion extends from a forward end of the sleeve post; and
   the slot defined in an interior face of the bore.

6. The spinning blade mechanism of claim 5, wherein an aft end of the protrusion is spaced apart from a forward end of the sleeve cone such that a longitudinal length of the central hub is carried between the aft end of the protrusion and the forward end of the sleeve cone.

7. The spinning blade mechanism of claim 2, wherein the bore is dimensioned for axial rotation of the spinner about the sleeve post.

8. A spinning blade mechanism for a fishing bait, comprising:
- a sleeve having a leading end and a trailing end, a sleeve cone defining the trailing end of the sleeve, the sleeve cone defining a frustoconical cavity dimensioned to receive a head of a bait fish within the frustoconical cavity, a sleeve post defining the leading end of the sleeve, the sleeve post defining a cylindrical shaft, and a protrusion extending from the cylindrical shaft,
- a spinner having a central hub, a plurality of blades extend radially outward from the central hub, and a bore extending through the central hub, a slot defined along the bore, the slot dimensioned to receive the protrusion when axially aligned; wherein the protrusion retains the spinner on the sleeve post when the protrusion and the slot are misaligned, and the spinner rotationally carried on the sleeve post.

9. The spinning blade mechanism of claim 8, further comprising:
- an interior channel defined through the sleeve post and dimensioned to receive a fishing line through the interior channel.

10. The spinning blade mechanism of claim 8, wherein the plurality of blades are disposed in a spaced apart relation about a rotational axis of the central hub.

11. The spinning blade mechanism of claim 10, wherein the plurality of blades have an aft swept curvature along a leading edge of each of the plurality of blades and terminate at an upturned end at a trailing edge of each of the plurality of blades.

* * * * *